Figure 1:
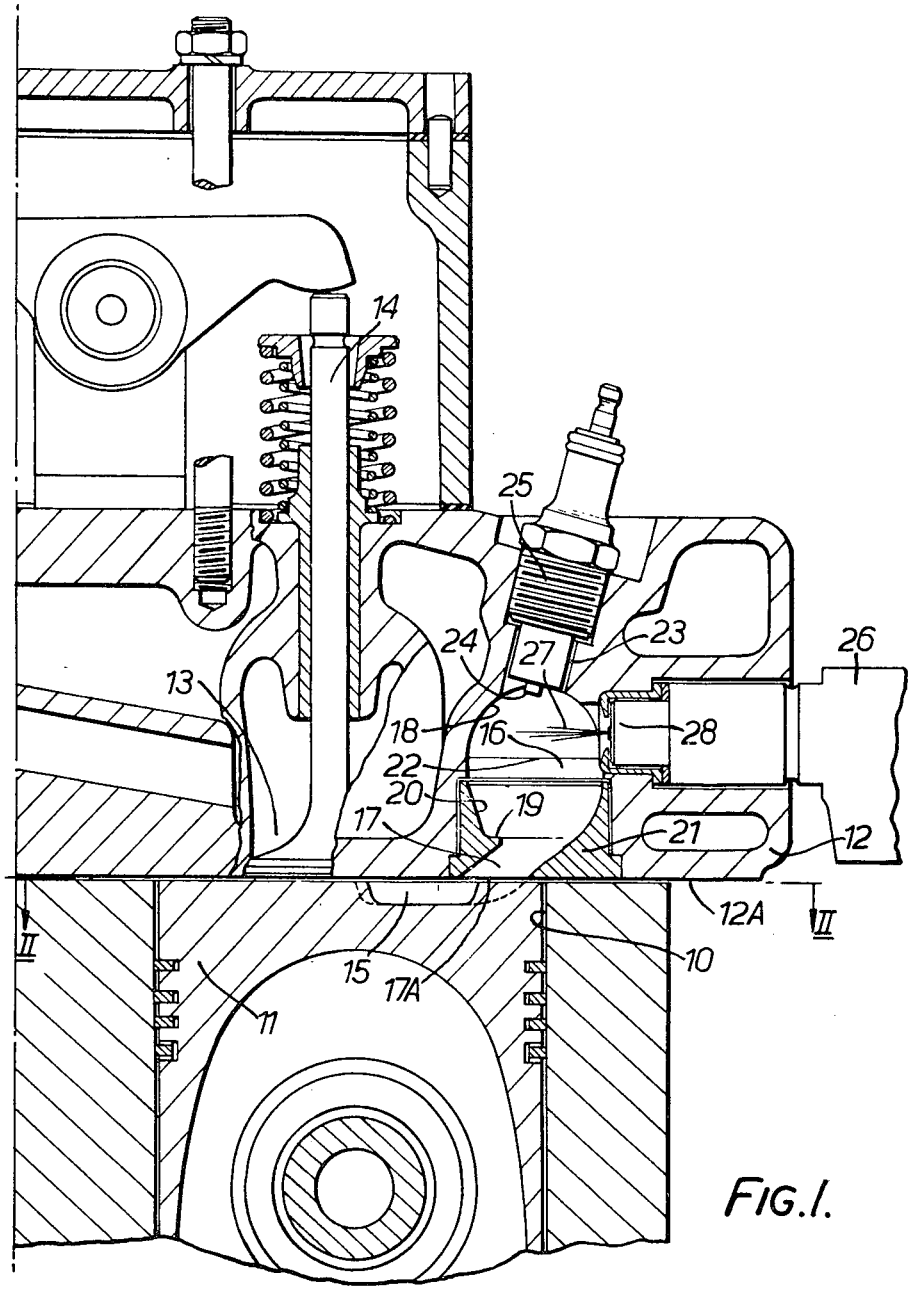

United States Patent [19]

Downs

[11] 3,963,003
[45] June 15, 1976

[54] COMBUSTION CHAMBER ARRANGEMENTS FOR I.C. ENGINES

[75] Inventor: Diarmuid Downs, Hove, England

[73] Assignee: Ricardo & Co. Engineers (1927) Ltd., Shoreham-by-Sea, Sussex, England

[22] Filed: June 3, 1974

[21] Appl. No.: 475,919

[30] Foreign Application Priority Data

June 5, 1973 United Kingdom............... 26855/73

[52] U.S. Cl. .......................... 123/32 K; 123/32 SP; 123/32 ST
[51] Int. Cl.² .......................................... F02B 3/00
[58] Field of Search ............. 123/32 J, 32 H, 32 SJ, 123/32 SP, 32 K, 32 C, 32 ST, 32 R

[56] References Cited
UNITED STATES PATENTS

| | | | |
|---|---|---|---|
| 2,795,215 | 6/1957 | Holt | 123/32 K |
| 2,821,177 | 1/1958 | Holt | 123/32 K |
| 2,911,959 | 11/1959 | Millington | 123/32 K |
| 3,025,839 | 3/1962 | Crowther | 123/32 R |
| 3,044,454 | 7/1962 | Sutton | 123/32 J |
| 3,140,697 | 7/1964 | Peras | 123/32 R |
| 3,257,994 | 6/1966 | Clements | 123/32 R |
| 3,508,530 | 4/1970 | Clawson | 123/32 ST |
| 3,824,965 | 7/1974 | Clawson | 123/32 SP |

*Primary Examiner*—Charles J. Myhre
*Assistant Examiner*—Daniel J. O'Connor
*Attorney, Agent, or Firm*—Cushman, Darby & Cushman

[57] ABSTRACT

An internal combustion engine of the "stratified charge" type has for the or each cylinder a primary ignition chamber in the cylinder head which communicates via a throat with its corresponding cylinder. The primary ignition chamber has a generally round concave upper portion, a generally frusto-conical lower side portion and a flat bottom surface towards which the lower side portion tapers. The lower side portion, flat bottom surface and throat are formed in a plug member seated in the cylinder head. The primary ignition chamber has a tapped hole for a sparking plug and an injection hole for a fuel injection nozzle. The throat opens at one end into the primary ignition chamber through the flat bottom surface thereof and runs obliquely to its other end where it communicates with a shallow recess formed in the upper surface of the crown of the piston. During the compression stroke air drawn into the cylinder during the suction stroke is forced into the primary ignition chamber through the throat, past the injection hole to the sparking plug and rotates in the chamber about an axis through the central portion of the chamber perpendicular to the cylinder axis.

7 Claims, 2 Drawing Figures

COMBUSTION CHAMBER ARRANGEMENTS FOR I.C. ENGINES

This invention relates to internal combustion engines of the spark-ignited liquid-fuel-injection type which employ petrol or like volatile liquid as fuel.

The tightening of legislation on permitted exhaust emissions from automobile engines, and growing concern over future availability of petroleum fuels, particularly petrol, is focussing attention on the development of petrol engines for automobiles which combine low exhaust emissions with good fuel economy.

Conventional piston-type petrol engines are normally supplied with an approximately stoichiometric air/fuel mixture in order to obtain the maximum possible power output under given engine operating conditions. In practice the mixture strength for maximum power is usually about 15% richer than the stoichoimetric value. Under these conditions the fuel is incompletely burnt so that unburnt hydrocarbons and carbon monoxide are present as undesirable emissions in the exhaust gas, along with nitrogen oxides. Strong legislative and other pressures exist to reduce the levels of these undesirable emissions. It has been shown that these emission levels vary with the air/fuel mixture strength supplied for combustion, and to reduce the carbon monoxide and nitrogen oxide emissions it is necessary to work with a much greater air/fuel ratio than the stoichiometric value. A major problem is to obtain regular combustion when the mixture strength is weakened significantly. It is almost certain that it is occasional misfiring of the engine which is responsible for the rise in unburnt exhaust hydrocarbons, after an initial reduction, as the mixture strength is progressively reduced. This problem is aggravated by the difficulty in providing equal quantities of fresh mixture at a constant mixture strength to all cylinders of a multi-cylinder engine under all operating conditions. This means that one or more cylinders may be running weaker than the others and are therefore likely to have erratic ignition of the air/fuel mixture.

Such irregular running is complicated by the difficulty in igniting such much-weakened mixtures reliably in engines having conventional combustion chamber forms and using spark plugs.

It has already been proposed to provide a separate chamber communicating with the remainder of the total top-dead-centre clearance volume of each cylinder, and to concentrate a much richer mixture in this primary ignition chamber, which mixture can be ignited therein in a conventional manner with ease. Once ignited, the burning mixture is ejected into, or is allowed to expand into a larger volume of either pure air or much-weakened mixture in the main part of the top-dead-centre clearance volume, with the result that the whole mixture charge is efficiently burnt to give low levels of noxious exhaust emissions. Engines provided with such arrangements are generally known as "stratified charge" engines.

An object of the present invention is to provide a stratified-charge engine with an improved combustion chamber arrangement employing such a primary ignition chamber, which will give relatively low levels of noxious exhaust emissions, including nitrogen oxides, with efficient overall combustion.

According to the present invention an internal combustion engine of the spark-ignited liquid-fuel-injection type has a cylinder block formed with a cylinder, a piston reciprocable in the cylinder, a cylinder head, and a primary ignition chamber formed in the cylinder head, into which chamber a substantial part of the air charge drawn into the cylinder on each suction stroke of the piston is forced during each subsequent compression stroke through a throat leading from the cylinder into the chamber, characterised in that the chamber is so shaped and arranged with respect to the throat that the charge entering the chamber is forced to rotate in the chamber about an axis through the central portion of the chamber perpendicular to the cylinder axis, the primary ignition chamber having a generally round concave upper portion, a flat bottom surface which is symmetrically disposed with respect to and opposite to the round upper portion, and a generally frusto-conical lower side portion which extends from the flat bottom surface towards the rounded upper portion and is of tapering form towards the flat bottom surface, the said lower side portion and flat bottom surface being formed in a plug member inserted in the cylinder head, and the throat being formed in the plug member and extending obliquely to the flat bottom surface through which it opens at one end into the chamber, the throat at its other end communicating with a shallow recess formed in the upper surface of the piston crown, that a tapped hole is formed in the cylinder head for a spark ignition plug, the said tapped hole opening into the upper part of the primary ignition chamber, and that an injection hole is formed in the cylinder head to receive a fuel injection nozzle, the injection hole opening into the primary ignition chamber at a point of its surface upstream of the ignition plug hole and downstream of the said one end of the throat with respect to the direction of rotation of the charge in the chamber about the said axis of rotation.

The throat at its said other end preferably communicates asymmetrically with the recess in the upper surface of the piston crown. The recess together with the primary ignition chamber may constitute substantially the whole of the top-dead-centre clearance volume with the internal volume of the primary ignition chamber preferably comprising not more than 50% of and not less than 25% of the total top-dead-centre clearance volume. The total top-dead-centre clearance volume preferably comprises not less than 9% of the cylinder swept volume, corresponding to a compression ratio of not more than 12.1:1. A tapped hole for a spark ignition plug may be located on or near the centre line in the generally round concave upper portion of the primary ignition chamber. Desirably the injection hole is located in the generally round concave upper portion of the primary injection chamber with its spraying axis directed (e.g. at right angles to the cylinder axis) above the centre of the said upper portion and at right angles to the said axis of rotation of the air charge.

Figure 2:
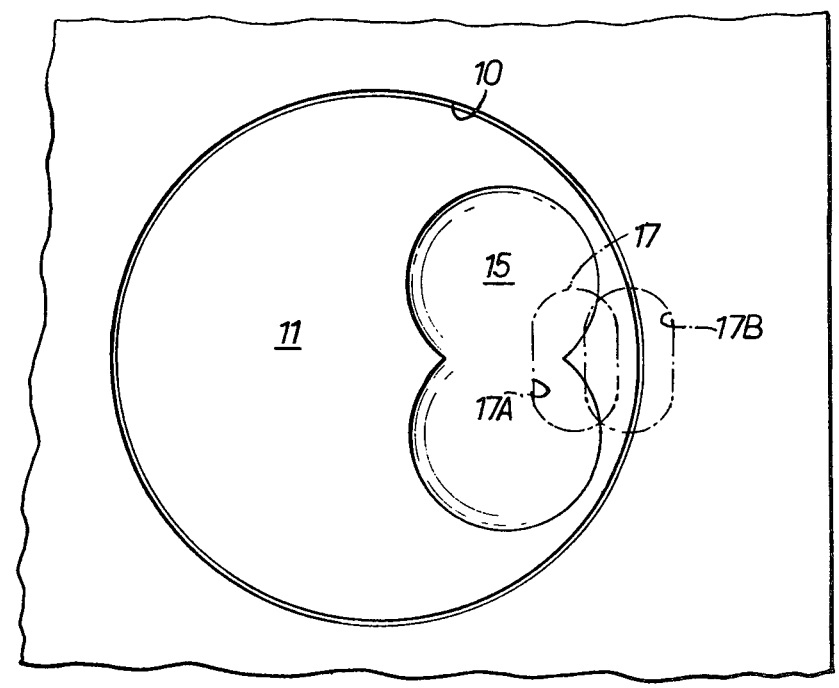

The invention may be carried into practice in various ways, but one specific embodiment will now be described by way of example only and with reference to the accompanying drawings, in which:

FIG. 1 shows in axial section the upper part of one cylinder of a multi-cylinder stratified-charge petrol engine and the associated part of the cylinder head; and FIG. 2 is a cross-section on the line II—II of FIG. 1.

In the illustrated embodiment the cylinder 10 in which the piston 11 reciprocates is provided with a cylinder head 12 having an inlet valve port 13 provided with a poppet-type valve 14 through which a pure air is aspirated during the induction stroke of the engine. The cylinder head is also provided with the usual valve-controlled exhaust port (not shown). At the top-dead-centre position of the piston 11, the crown of the piston approaches closely to the flat surface of the cylinder head 12 in which the inlet port 13 and exhaust port are formed, and the crown of the piston 11 is flat but is formed with a shallow recess 15 which as shown in plan in FIG. 2 comprises a pair of intersecting circular recesses which are located asymmetrically on one side of the centre of the piston crown.

Also formed in the cylinder head 12 is a separate water-cooled primary ignition chamber 16 which communicates via a transfer passage 17 with the recess 15. The outer end 17A of the transfer passage 17 overlies the recess 15 so as to communicate with the interior of the recess when the piston is at top-dead-centre, and the transfer passage 17 extends upwardly and outwardly at an acute angle of about 40° to the plane lower surface 12A of the cylinder head 12 and enters the lower part of the primary ignition chamber 16.

The primary ignition chamber 16 is of generally rounded form having a hemispherical upper part 18, a plane (flat) bottom surface 19 which is symmetrically disposed opposite to the hemispherical upper part 18, and a generally frusto-conical lower part 20 which tapers towards the flat bottom surface 19. The frusto-conical lower part of the primary ignition chamber and its flat bottom surface are afforded by a separate so-called "hot plug" 21 of refractory material which is inserted into a well in the cylinder head 12 and merges with the hemispherical head 18 thereof. The transfer passage 17 is formed in the hot plug 21, and the mouth of the transfer passage 17, i.e. its inner end 17B which enters the primary ignition chamber 16, is formed in the flat bottom surface 19 thereof which is parallel to the plane lower face 12A of the cylinder head 12. The cross-section of the transfer passage 17 is of generally rectangular form, as shown in FIG. 2, and its mouth 17B is offset towards the right hand side of the flat bottom surface 19 as seen in FIG. 1. Thus when during the compression stroke of the piston the air aspirated into the cylinder is compressed, the greater part of that charge will be forced through the transfer passage 17 and into the primary ignition chamber 16 in a stream which will enter the chamber 16 generally tangentially and will set up a rotation of the charge in the chamber 16 about an axis which is at right angles to the longitudinal axis of the transfer passage 17 and to the plane of the paper in FIG. 1, this axis of rotation being at or close to the centre 22 of the upper hemispherical part 18 of the chamber 16, and the rotation being in the anti-clockwise direction as seen in FIG. 1.

A spark plug socket 23 is formed in the cylinder head 12 and enters the centre of the upper hemispherical part 18 of the primary ignition chamber 16, so that the electrodes 24 of a spark plug 25 inserted into the socket 23 will be located at or adjacent to the level of the circumferential surface of the chamber 16 diametrically opposite to the mouth 17B of the transfer passage 17. A liquid fuel injector 26 is also provided in the cylinder head 12 to inject a spray 27 of liquid petrol into the upper part of the chamber 16 at the right-hand side thereof as seen in FIG. 1. The fuel injector nozzle 28 is located in a recess in the upper hemispherical part 18 of the chamber 16, between the mouth 17B of the transfer passage 17 and the electrodes 24 of the spark plug 25, and injects the fuel spray 27 during the compression stroke in a direction parallel to the flat bottom surface 19 of the chamber 16, and into the outer part of the rotating air or mixture charge in the chamber 16 which is sweeping during the compression stroke from the mouth 17B of the transfer passage 17 towards the spark plug electrodes 24 around the right hand part of the surface of the chamber 16 as seen in FIG. 1. Thus this rotating part of the charge will tend to carry the droplets of the fuel spray towards and onto the electrodes 24 of the spark plug so that the fuel will be ignited thereby.

The spark plug 20 is of the positively-timed high-energy type, and the nozzle 28 of the fuel injector 26 which may be of the pintle or plain hole type has characteristics such that the combination of the liquid spray pattern 27 and of the swirling charge motion in the primary ignition chamber 16 gives a roughly stoichiometric mixture strength at the electrodes 24 of the spark plug. The ignition of this rich mixture in the chamber 16 is reliable and produces relatively low combustion temperatures within the chamber 16, whereby the amount of nitrogen oxides produced will be comparatively low. Subsequent outflow of the partly-burned mixture through the transfer passage into the piston recess 15 will weaken the mixture in the recess 15 where the combustion will be completed efficiently, with low noxious exhaust emissions. The parameters in the fuel injection pump will be chosen to determine the rate and phasing of the petrol injection into the primary ignition chamber 16 so as to optimize the desired engine operating mixture strength and power output.

To avoid the phenomenon known as "knock" when operating on a given grade of petrol the total clearance volume of each cylinder should preferably not be smaller than 9.1% of the cylinder swept volume, i.e. the compression ratio will not be greater than 12:1. The volume within the primary ignition chamber, including the transfer passage, should not be greater than 50% of the total clearance volume per cylinder, and may be considerably smaller to optimise ignition and the overall mixture strength required for low exhaust emissions; it should not however be less than 25% of the total clearance volume per cylinder.

Normally, the petrol injected into the primary ignition chamber 16 by the injector 26 will comprise the total quantity of fuel necessary to produce the required engine output, pure air being aspirated through the engine inlet valves.

It will be appreciated that the shape of the primary ignition chamber 16, and the asymmetrical arrangement of the inclined transfer passage with respect to the piston recess 15, will ensure that the swirl produced in the charge in the primary ignition chamber will be extended to the charge in the piston recess 15 during combustion, thereby enhancing completeness of the combustion.

What I claim as my invention and desire to secure by Letters Patent is:

1. An internal combustion engine of the spark-ignited gasoline fuel injection type having
    a cylinder block formed with one or more cylinders,
    a piston reciprocable in each cylinder,
    a cylinder head,
    a primary ignition chamber associated with each cylinder and formed in the cylinder head,
    a throat through which a substantial part of the air charge drawn into the cylinder on each suction stroke of the piston is forced during each subsequent compression stroke into the chamber, and of which one end opens into the cylinder opposite a shallow recess in the upper surface of the piston crown while the other end opens obliquely into the chamber so that the charge entering the chamber rotates about an axis through the central portion of the chamber, the bottom of the chamber being formed in a plug member inserted in the cylinder head, the total top dead centre clearance being such as to provide a compression ratio not exceeding 12.1:1, a spark ignition plug projecting into the upper part of the primary ignition chamber, a fuel injection nozzle opening into the primary ignition chamber at a point of its surface upstream of the ignition plug and downstream of the throat with respect to the direction of rotation of the charge in the chamber, means for injecting the whole of the gasoline fuel through the injection nozzle into the primary ignition chamber during the compression stroke, and means for producing a spark at the sparking plug to ignite the swirling mixture of the said gasoline and the air with the air driven into the primary chamber through the throat.

2. An internal combustion engine according to claim 1, in which the throat at its said one end communicates asymmetrically with the recess in the upper surface of the piston crown.

3. An internal combustion engine according to claim 1, in which the recess together with the primary ignition chamber constitutes substantially the whole of the top-dead-centre clearance volume.

4. An internal combustion engine according to claim 3, in which the internal volume of the primary ignition chamber comprises not more than 50% of and not less than 25% of the total top-dead-centre clearance volume.

5. An internal combustion engine according to claim 1, in which the spark ignition plug is located on or near the centre line in a generally round concave upper portion of the primary ignition chamber.

6. An internal combustion engine according to claim 1 in which the injection hole is located in a generally round concave upper portion of the primary injection chamber with its spraying axis directed above the centre of the said upper portion and at right angles to the said axis of rotation of the air charge.

7. An internal combustion engine according to claim 5 in which the said spraying axis is directed at right angles to the cylinder axis.

* * * * *